US012170158B2

(12) United States Patent
Asakura et al.

(10) Patent No.: US 12,170,158 B2
(45) Date of Patent: Dec. 17, 2024

(54) CABLE AND CABLE MANUFACTURING METHOD

(71) Applicant: FURUKAWA ELECTRIC CO., LTD., Tokyo (JP)

(72) Inventors: Toyomitsu Asakura, Tokyo (JP); Eiji Konda, Tokyo (JP); Yoshimitsu Kuroki, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 213 days.

(21) Appl. No.: 17/983,830

(22) Filed: Nov. 9, 2022

(65) Prior Publication Data

US 2023/0083864 A1 Mar. 16, 2023

Related U.S. Application Data

(63) Continuation of application No. PCT/JP2021/016970, filed on Apr. 28, 2021.

(30) Foreign Application Priority Data

May 20, 2020 (JP) ................................ 2020-088387

(51) Int. Cl.
*H01B 7/285* (2006.01)
*H01B 7/18* (2006.01)
(Continued)

(52) U.S. Cl.
CPC ............... *H01B 7/285* (2013.01); *H01B 7/18* (2013.01); *H01B 13/10* (2013.01); *H01B 13/26* (2013.01); *H01B 13/32* (2013.01)

(58) Field of Classification Search
CPC ........ H01B 13/32; H01B 13/26; H01B 13/10; H01B 7/18; H01B 7/285
(Continued)

(56) References Cited

U.S. PATENT DOCUMENTS 5,250,349 A 10/1993 Nakagawa et al.

FOREIGN PATENT DOCUMENTS

CA 2 857 698 A1 6/2013
JP B1976020710 6/1976
(Continued)

OTHER PUBLICATIONS

International Preliminary Report on Patentability issued in PCT Patent Application No. PCT/JP2021/016970 dated Nov. 17, 2022.
(Continued)

*Primary Examiner* — Tremesha W Burns
(74) *Attorney, Agent, or Firm* — MARSHALL, GERSTEIN & BORUN LLP

(57) ABSTRACT

A metallic cable includes, in order from an inner side thereof, a plurality of coated conduction wires, a press winding tape, a laminated tape, and an outer jacket. The outer jacket is provided on an outer circumference of the laminated tape and such that it covers the outer circumference of the laminated tape. The outer jacket is made of polyethylene having a density greater than or equal to that of medium-density polyethylene (MDPE) (≥930 kg/m$^3$), and more preferably made of high-density polyethylene (≥942 kg/m$^3$). If polyethylene having a density that is equal to or greater than that of MDPE is used to form the outer jacket, the temperature that is appropriate for extruding MDPE approaches a bonding temperature range of the resin layer of the laminated tape. The resin layer and the metal layer can be bonded and joined together at an overlapped part, tightly enclosing a cable core.

9 Claims, 7 Drawing Sheets

(51) Int. Cl.
*H01B 13/10* (2006.01)
*H01B 13/26* (2006.01)
*H01B 13/32* (2006.01)

(58) Field of Classification Search
USPC .......................................................... 174/23 R
See application file for complete search history.

(56) References Cited

FOREIGN PATENT DOCUMENTS

| | | | |
|---|---|---|---|
| JP | A1978141483 | | 12/1978 |
| JP | S5421586 | A | 2/1979 |
| JP | U11979015781 | | 2/1979 |
| JP | U11979093789 | | 7/1979 |
| JP | A1984159843 | | 9/1984 |
| JP | A1991368640 | | 3/1991 |
| JP | A1993314825 | | 11/1993 |
| JP | H05314825 | A | 11/1993 |

OTHER PUBLICATIONS

First Examination Report issued in Indian Patent Application No. 202247072605 dated Jan. 2, 2023.
Office Action, Japanese patent application No. 2020-088387, mailing date May 6, 2024.
International Search Report issued in PCT Application No. PCT/JP2021/016970, mailed Jul. 13, 2021.

CABLE AND CABLE MANUFACTURING METHOD

TECHNICAL FIELD

The present invention mainly relates to a cable in which a laminated tape is wrapped around an outer circumference of a cable core.

BACKGROUND

A conventionally known communication cable includes, for example, a cable core formed of optical fibers and coated conduction wires, a laminated tape including a metal layer and being formed in a tube shape on an outer circumference of the cable core, and a sheath made of resin, such as polyethylene, covering an outer circumference of the laminated tape. The laminated tape used here includes, for example, a thin plate-like metal layer and a fusion resin layer that is laminated on the metal layer and is made of polyolefin resin.

The laminated tape is formed into a tube shape by overlapping both end parts of a width direction of the laminated tape in a longitudinal direction thereof. The cable core is accommodated inside the laminated tape, and an outer jacket is extruded to cover the outer circumference of the laminated tape, thus forming the cable. At this time, the fusion resin layer melts due to heat used for forming the cable, and the end parts of the fusion layer overlapping each other are solidified, bonded, and joined (see Japanese Unexamined Patent Application Publication No. H05-314825 (JP-A-H05-314825), for example).

With the laminated tape provided as above, the metal layer of the laminated tape stops water from entering into an inner part of the cable core, and this enables to prevent deterioration of transmission characteristics of the cable.

However, because of the recent climate change and globalization, the highest temperature record during daytime is approximately 41° C. in Japan and even over 50° C. abroad. Adding further a temperature rise due to sunshine, the conventional environment-resistant temperature is becoming insufficient under the current situations. When used at a temperature higher than the environment-resistant temperature, the resin layer of the laminated tape may soften, making adhesive to come off and reducing strength, or problems such as generation of protrusions at overlapped parts of the laminated tape may occur.

As a countermeasure, there is a method in which a laminated tape is formed using resin based on a high-temperature resistant thermoplastic resin with grafted maleic anhydride, for example, and a polyethylene-made outer jacket is formed after longitudinally attaching the laminated tape to the cable core. However, using such the resin layer based on a high-temperature resistant thermoplastic resin with grafted maleic anhydride may cause a problem that the overlapped part may not be joined properly. This may impair water-stopping performance of the cable. Also, the cable is sometimes bent, or kept being bent, when being installed underground etc. on site. Thus, when the cable is bent or twisted, it may not be able to obtain sufficient water-stopping effects, especially at a high temperature.

SUMMARY OF THE DISCLOSURE

The present invention was made in view of such problems, and its main object is to provide a cable that shows an excellent water-stopping performance even at a high temperature.

To achieve the above object, a first aspect of the present invention is a cable including a cable core, an outer jacket that is provided on an outermost circumference of the cable core, and a laminated tape that is disposed inside the outer jacket and wrapped around an outer circumference of the cable core. The laminated tape includes a resin layer and a metal layer that are laminated on one another. The laminated tape is wrapped around the outer circumference of the cable core forming an overlapped part at which both end parts of the laminated tape are overlapped. A base resin of the resin layer includes at least one of medium-density polyethylene, high-density polyethylene, or polypropylene, and the base layer is added with maleic anhydride and grafted. An amount of resin at and near the overlapped part of the laminated tape is greater than an amount of resin at parts other than the overlapped part. The outer jacket is made of polyethylene having a density that is greater than or equal to that of medium-density polyethylene.

Preferably, the outer jacket is made of high-density polyethylene.

Preferably, the outer jacket and the resin layer of the laminated tape are joined together continuously in a longitudinal direction.

A part of the overlapped part of the laminated tape having a thickness that is greater than a thickness of the resin layer at parts other than the overlapped part may be formed.

Preferably, waterproofing resin is injected into the overlapped part of the laminated tape.

Preferably, the waterproofing resin is made of the same material as the resin layer of the laminated tape.

A thickness of the outer jacket may be 10% or less of an outer diameter of the cable, and the thickness of the outer jacket may be 8% or less of the outer diameter of the cable.

According to the first aspect of the present invention, the resin layer of the laminated tape is made of polyethylene or polypropylene, and the resin of the outer jacket is made of polyethylene having a density that is greater than or equal to that of medium-density polyethylene. This ensures that the resin layer at the overlapped part of the laminate tape melts when the outer jacket is extruded. This can make certain that the overlapped part of the laminated tape is joined. As a result, the laminated tape can be wrapped around the outer circumference of the cable core without leaving any gaps, and this can improve water-shielding performance.

The base resin is formed of a material such as medium-density polyethylene (MDPE), high-density polyethylene (HDPE), and polypropylene, with grafted maleic anhydride. Adding maleic anhydride at a quantity between 0.1 mass % and 3 mass % allows a softening temperature of the resin to be 75° C. or higher, which enables to obtain a high environment-resistant temperature as well as a melt mass flow rate, specified in JIS K6922-2, to be within a predetermined range. This eliminates the need for changing the manufacturing facilities to cope with the high temperatures, which results in excellent manufacturability. As above, since the base resin is made of either MDPE, HDPE, or polypropylene and is added with maleic anhydride and grafted, the laminated tape can bear high temperatures and the resin layer and the outer jacket can be joined with certainty even if the outer jacket is made of polyethylene of medium or higher density.

Also, by making the thickness of the part of the overlapped part of the resin layer of the laminated tape greater than the thickness at parts other than the overlapped part, the overlapped part can be joined with more certainty.

Also, the outer jacket and the resin layer of the laminated tape are joined continuously in the longitudinal direction, and thus the water-stopping performance can be further improved.

Also, injecting the waterproofing resin into the overlapped part of the laminated tape can prevent opening of the overlapped part, eliminate irregular joints at the overlapped part, and thus join the overlapped part with certainty, so that the water-stopping performance can be further improved.

Also, the thickness of the outer jacket is 10% or less, or preferably 8% or less, of the outer diameter of the cable, which can reduce the outer diameter of the cable.

A second aspect of the present invention is a cable manufacturing method. The method includes wrapping the laminated tape, injecting waterproofing resin into a space between both ends of the laminate tape at the overlapped part before extruding the outer jacket, and forming the outer jacket by extrusion at a temperature of 200° C. or higher.

According to the second aspect of the present invention, the overlapped part of the laminated tape can be joined with certainty, and thus the water-stopping performance can be improved.

In particular, by injecting the waterproofing resin into the gap at the overlapped part of the laminated tape before extruding the outer jacket, opening of the overlapped part can be prevented so that further improved water-stopping performance can be obtained.

The present invention can mainly provide a cable that shows an excellent water-stopping performance.

DETAILED DESCRIPTION

Figure 1:
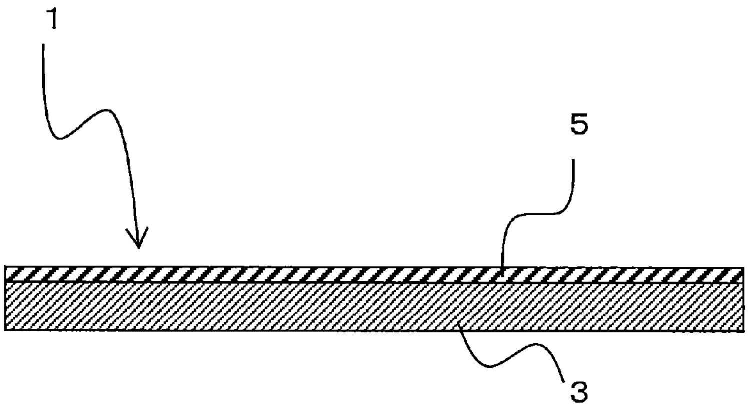
FIG. 1 is a cross-sectional view of a laminated tape 1.

Hereinafter, some embodiments of the present invention will be described with reference to the accompanying drawings. FIG. 1 is a cross-sectional view of a laminated tape 1. The laminated tape 1 includes a resin layer 5 and a metal layer 3 that is laminated on the resin layer 5. The laminated tape 1 is used being wrapped inside an outer jacket of a cable.

Non-limiting materials that can be used for the metal layer 3 of the laminated tape 1 are aluminum (including aluminum alloys), stainless steel, copper (including copper alloys), and steel. The resin layer 5 may also be laminated on each surface of the metal layer 3.

The resin layer 5 of the laminated tape 1 includes at least one of materials including MDPE, HDPE, and polypropylene (PP) as a base resin. Using polypropylene allows a softening temperature to be 75° C. or higher. The softening temperature of resin can be measured according to JIS K7196 (1991), for example.

The base resin forming the resin layer 5 includes at least one of materials including MDPE, HDPE, and polypropylene (PP), and is added with maleic anhydride at a quantity between 0.1 mass % and 3 mass % and grafted. It is preferable that polyethylene or polypropylene forming the resin layer 5 is added with maleic anhydride at a quantity between 0.1 mass % and 1.5 mass %, or more preferably between 0.3 mass % and 0.6 mass % or between 0.9 mass % and 1.2 mass %, and then grafted. This allows a melt mass flow rate, specified by JIS 7210-1 (2014), of MDPE, HDPE, or polypropylene (PP), etc. forming the resin layer 5 to be in a range between 0.2 g/10 min. and 20 g/10 min. More preferably, the melt mass flow rate of MDPE, HDPE, or polypropylene (PP), etc. forming the resin layer 5 is between 1.0 g/10 min. and 15 g/10 min.

If the melt mass flow rate is too low, resistance of an extruding screw increases at the time of extruding the cable outer jacket, which reduces extrusion speed, and thus impairing the manufacturability. If the melt mass flow rate is too high on the other hand, there may be problems in shape maintenance during the manufacture. The melt mass flow rate can be measured according to JIS K7210-1 (2014), for example.

Figure 2:
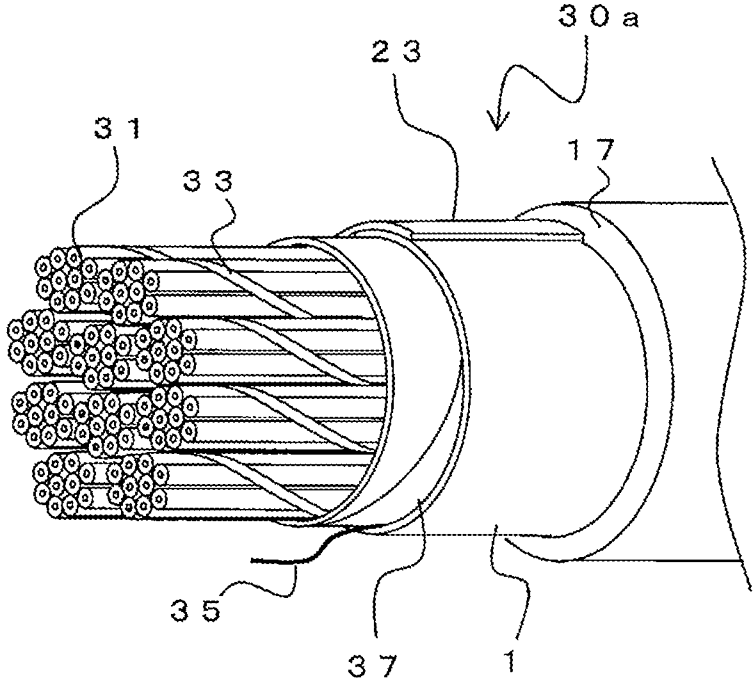
FIG. 2 is a perspective view of a metallic cable 30*a* using the laminated tape 1.
Figure 3:
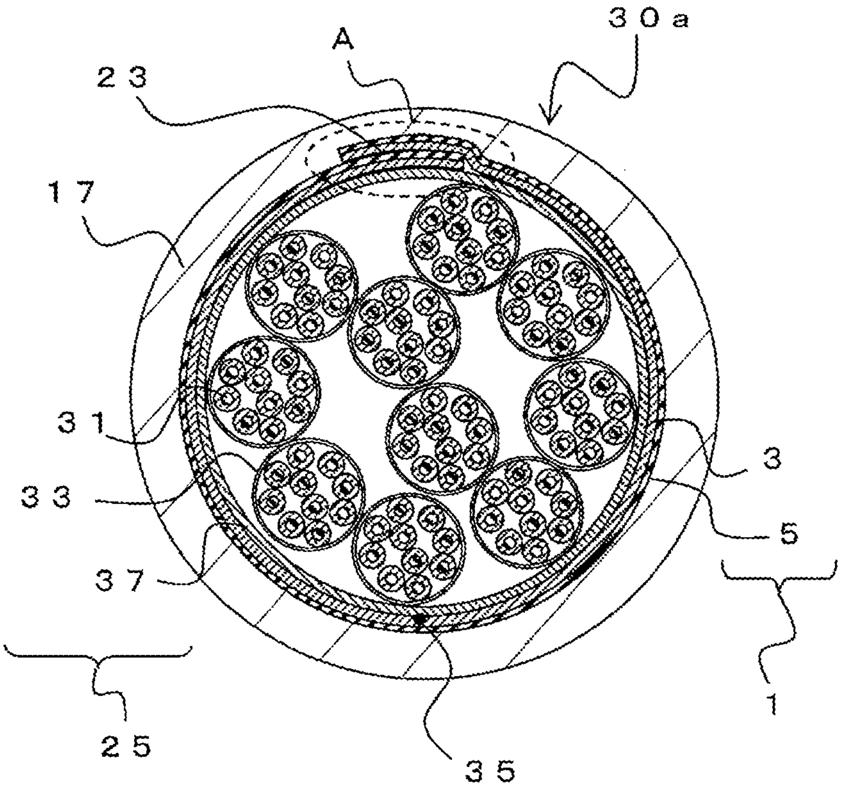
FIG. 3 is a cross-sectional view of the metallic cable 30*a* using the laminated tape 1.

Next, an example of the cable in which the laminated tape 1 is used will be described. FIG. 2 is a perspective view and FIG. 3 is a cross-sectional view showing a metallic cable 30*a*.

The metallic cable 30*a* mainly includes, in order from an inner side thereof, a plurality of coated conduction wires 31, a press winding tape 37, the laminated tape 1, and an outer jacket 17. The coated conduction wire 31 includes a conductor and an insulation coating covering the conductor.

The conductor of the coated conduction wire 31 is made of aluminum or copper, for example, and a solid wire as illustrated or a stranded conductor whose illustration is omitted may also be used. The insulation coating is provided on an outer circumference of the conductor. The insulation coating is formed over substantially an entire length of the conductor. The insulation coating is formed of a resin having an insulation property. The coated conduction wire 31 including the conductor and the insulation coating is used as a single solid wire, or may be as a pair wire by twisting two of the wires, or as a quad wire by twisting four of the wires.

A rough-winding string 33 bundles up the plurality of the coated conduction wires 31. The press winding tape 37 is further wound around an outer circumference of a plurality of the bundles, bundling together the bundles, each of which is formed of the plurality of the coated conduction wires 31. In the metallic cable 30*a*, the plurality of the coated conduction wires 31 bundled up by the press-winging tape 37 is regarded as a cable core 25. The press winding tape 37 may be a rough-winding string since the press winding tape 37 only needs to bundle up the plurality of the coated conduction wires 31.

Here, there are various ways to form the cable core 25. For example, there is a method in which pair wires or quad wires are stranded to be a unit and the units are further stranded; or a method in which solid wires, pair wires, or quad wires are stranded to form a center layer, and first and second layers of stranded solid wires, pair wires, or quad wires are further formed over the center layer.

The laminated tape 1 is wrapped around an outer circumference of the press winding tape 37. The laminated tape 1 is wrapped longitudinally so that both end parts in a width direction thereof overlap each other in a circumferential direction. That is, the laminated tape 1 is wrapped around the outer circumference of the cable core 25 with a longitudinal direction of the laminated tape 1 being in the same direction as an axial direction of the cable core 25. At this time, an overlapped part 23 at which the both end parts of the laminated tape 1 are overlapped each other is formed in a substantially straight line in the axial direction of the cable core 25.

The outer jacket 17 is provided on an outer circumference of the laminated tape 1. The outer jacket 17 is provided so as to cover the outer circumference of the laminated tape 1. That is, the laminated tape 1 wrapped around the outer circumference of the cable core 25 is disposed inside the outer jacket 17, and the outer jacket 17 is provided on an outermost circumference of the cable core 25.

The outer jacket 17 is made of polyethylene having a density that is greater than or equal to that of medium-density polyethylene (930 $kg/m^3$ or greater), and is more preferably made of high-density polyethylene (942 $kg/m^3$ or greater). The outer jacket 17 may have additives such as carbon black.

To obtain manufacturability and flexibility, a common choice for a material of the outer jacket 17 is low-density polyethylene (LDPE). However, if conventional LDPE is used to form the outer jacket 17 by extrusion, heating at an extrusion temperature, which is appropriate for LDPE and comparatively low, is insufficient to melt the resin layer 5 of the laminated tape 1, and thus the resin layer 5 and the metal layer 3 may not be bonded and joined together at the overlapped part 23.

On the other hand, if polyethylene having a density that is equal to or greater than that of MDPE is used to form the outer jacket 17, the temperature that is appropriate for extruding MDPE approaches a bonding temperature range of the resin layer 5 of the laminated tape 1. Thus, the resin layer 5 and the metal layer 3 can be bonded and joined together at the overlapped part 23 so as to tightly enclose the cable core 25.

Moreover, if the outer jacket 17 is formed of high-density polyethylene (HDPE), although the temperature is to be raised further than when extruding MDPE, rigidity of the outer jacket 17 can be kept at the same level even if its thickness is reduced. This allows the thickness of the outer jacket 17 to be 10% or less of an outer diameter of the metallic cable 30*a*, or more preferably to be 8% or less of the outer diameter of the metallic cable 30*a*. For example, the thickness can be approximately 1.7 mm, while a thickness of a common outer jacket is approximately 2 mm. This makes it possible to reduce weight of the metallic cable 30*a*, to facilitate bending of the cable, and thus to improve workability of the cable.

The laminated tape 1 serves as a moisture-blocking layer in the metallic cable 30*a*. That is, the overlapped part 23 of the laminated tape 1 is bonded and joined and, furthermore, the resin layer 5 of the laminated tape 1 and the outer jacket 17 are joined together continuously in the longitudinal direction so that a pathway for moisture entry can be restricted.

The outer jacket 17 may not only be single layered, but double or more layered. In such cases, the laminated tape 1 may be disposed inside any layer of the outer jacket 17. Also, there may be two or more layers of the laminated tape 1, and, in addition to the laminated tape 1, a metallic exterior as an extra layer that fits for purpose may also be provided.

A rip cord 35 is disposed inside the metallic cable 30*a* between the laminated tape 1 and the cable core 25. Pulling out the rip cord 35 can rip up the laminated tape 1 and the outer jacket 17 so that the coated conduction wires 31 inside can be taken out.

The number of the coated conduction wires 31 or the number of the bundles of the coated conduction wires 31 forming the cable core 25 of the metallic cable 30*a* is not limited to the example shown in the drawings. Furthermore, a composite cable in which optic fibers or the like are disposed may also be used.

Figure 4A:
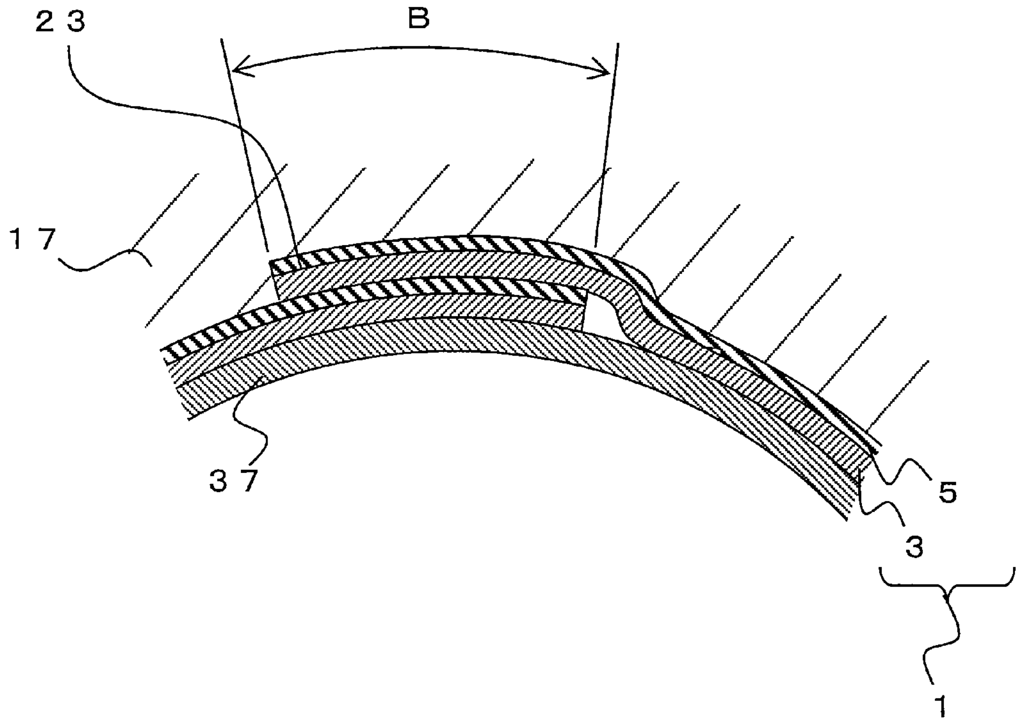
FIG. 4A is an enlarged view of a section A in FIG. 3.

As mentioned above, the laminated tape 1 has the overlapped part 23. FIG. 4A is an enlarged view of a section A in FIG. 3 and an enlarged view of the overlapped part 23. The laminated tape 1 is wrapped around the outer circumference of the cable core 25 with the resin layer 5 on an outer side. That is, the outer jacket 17 and the resin layer 5 are bonded and joined together. Also, at the overlapped part 23, the metal layer 3 of the outer end part is bonded and joined with the resin layer 5 of an inner end part.

Here, an overlapping length of the overlapped part 23 (B in the drawing) in the circumferential direction is preferably 1 mm or more, and 2.0 times or less of an outer diameter of the metallic cable 30*a*, and more preferably 1.5 times or less of the outer diameter. For example, the length of the overlapped part is approximately between 7 mm and 20 mm. If the overlapping length is too short, the water-shielding performance may be impaired due to opening of the overlapped part 23 when the metallic cable 30*a* is bent or the like. However, if the overlapped length is too long, the thickness of the moisture-blocking layer increases, affecting the flexibility.

Figure 4B:
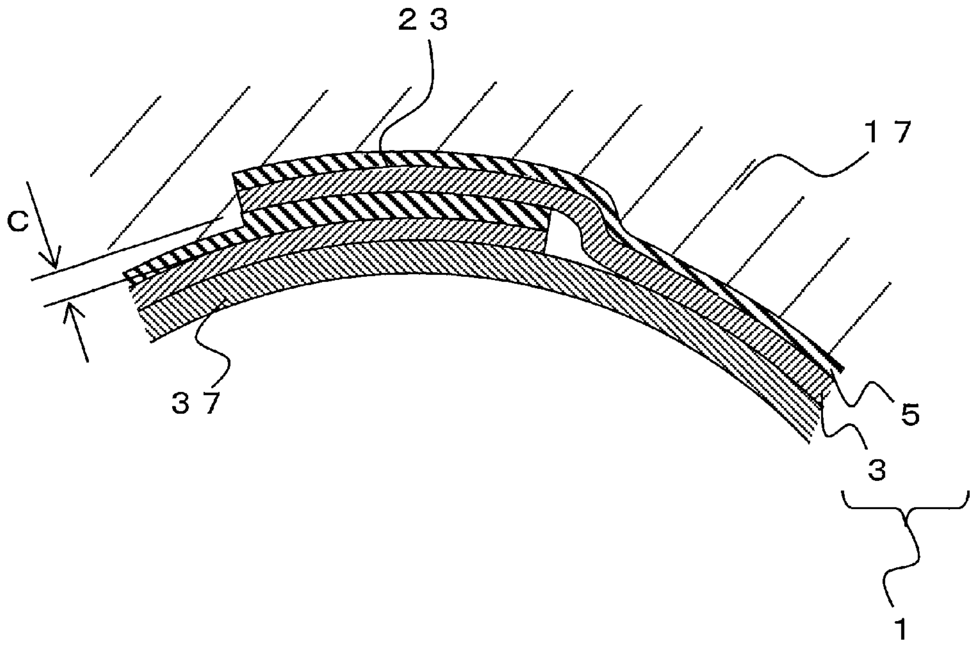
FIG. 4B is a view showing another embodiment of FIG. 4A.

Alternatively, as shown in FIG. 4B, the resin layer 5 may have a thick part formed on at least one end part of the laminated tape 1. In this way, the thickness of the resin layer 5 inside the overlapped part 23 of the laminated tape 1 (C in the drawing) is greater than the thickness of the resin layer 5 at parts other than the overlapped part 23. It is possible to consider increasing the thickness of an entire surface of the resin layer. However, equally increasing the thickness of the parts other than the overlapped part raises the cost of the material, and thus it is better to increase only the thickness of the overlapped part.

For example, when joining the end parts of the laminated tape 1 at the overlapped part 23 with the resin layer 5 having the thickness of approximately 50 μm, the resin layer may not be able to absorb unevenness of the outer circumference of the cable core 25 and thus the end part of the laminated tape 1 may lift up. Thus, by increasing the thickness of the resin layer 5 at the overlapped part 23 (to approximately 100 μm, for example), an opening of the overlapped part 23 can be prevented.

Figure 5:
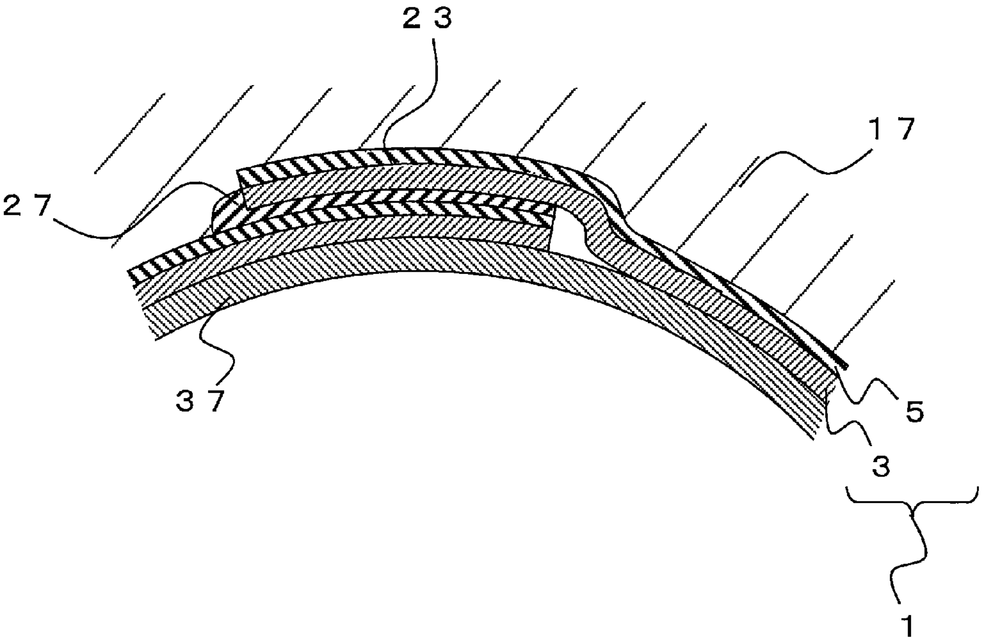
FIG. 5 is a view showing yet another embodiment of FIG. 4A.

Also, as shown in FIG. 5, a waterproofing resin 27 may be injected into the overlapped part 23 of the laminated tape 1. Injecting the waterproofing resin 27 into a space at the overlapped part 23 of the laminated tape 1 from an outer circumference of the overlapped part 23 can make a total thickness of resin near the overlapped part 23 (the resin layer 5+the waterproofing resin 27) greater than the thickness of the resin layer 5 at the parts other than the overlapped part 23. That is, making an amount of resin at and near the overlapped part 23 of the laminated tape 1 greater than an amount of resin at parts other than the overlapped part 23 can prevent the above-mentioned opening of the overlapped part 23, and thus the overlapped part 23 can be joined together with certainty. Alternatively, as shown in FIG. 4B, the thickness of the resin layer 5 at the overlapped part 23 may be increased and the waterproofing resin 27 may be further injected.

Also, when injecting the waterproofing resin 27 into the overlapped part 23, the waterproofing resin 27 is also applied to an outer part of the overlapped part 23 where there is a level difference. Thus, the waterproofing resin 27 can fill and smooth the level difference of the end parts of the overlapped part 23, ensuring that the outer jacket 17 and the resin layer 5 are bonded together without creating a gap. The same material as the resin layer 5 can be used for waterproofing resin 27, for example.

Next, a method for manufacturing the metallic cable 30*a* will be described. The insulation coating is formed by extrusion process, for example, over the outer circumference of the conductor to form the coated conduction wire 31. Next, the coated conduction wires 31 are stranded and twisted by assembling machine with pair wires, quad wires, a unit or stranded units, or multiple-layered pair wires or quad wires. Each bundle is bundled by the rough-winding string 33 as necessary. The press winding tape 37 is wound around bundling together a plurality of the bundles to form the cable core 25. The press winding tape 37 may be a rough-winding string or the like that can bundle the assembled core. The laminated tape 1 in which the resin layer 5, the metal layer 3, and the like are laminated in advance is then supplied and formed on the outer circumference of the press winding tape 37 (the cable core 25) in the longitudinal direction by using a forming machine or the like to form the moisture-blocking layer.

Here, as mentioned above, the overlapped part 23 at which the both end parts of the laminated tape 1 overlap each other is formed at the time of forming the laminated tape 1 into a tube shape. At this point the both end parts of the laminate tape are not fusion bonded or the like at the overlapped part 23. Thus, the overlapped part may open slightly, creating a gap. If the outer jacket is extruded in this state, the overlapped part 23 may be formed with the air remaining in the gap. This may cause a defective joint between the resin layer 5 and the metal layer 3 at the overlapped part 23.

Thus, to fill such the gap, it is preferable to inject the waterproofing resin 27 into the gap between the both end parts of the laminate tape 1 at the overlapped part 23 after wrapping the laminated tape 1 and before extruding the outer jacket 17. For example, after wrapping the laminated tape 1, a nozzle or a needle is butted at a joint part of an outer part of the overlapped part 23, into which the waterproofing resin 27 is then injected. Also, to even out the overlapped part 23, the outer circumference of the overlapped part 23 is pressed after injecting the waterproofing resin 27 as necessary. A thickness of the waterproofing resin 27 applied is approximately 1 mm or less. That is, an amount of the waterproofing resin 27 injected is adjusted such that a part of the waterproofing resin 27 is pushed out from the overlapped part 23. This can seal the overlapped part 23 and partly bond and join the overlapped part 23 in advance of extrusion of the outer jacket 17. This can also slightly smooth out the level difference formed at the overlapped part 23.

Next, on the outer circumference of the moisture-blocking layer formed by the laminated tape 1, the outer jacket 17 is extrusion-processed to be unified. Since the outer jacket 17 is made of either medium-density polyethylene or high-density polyethylene, the extrusion process is performed at a temperature higher than an extrusion temperature for conventional common polyethylene. For example, it is preferable that the outer jacket 17 is formed by extrusion at a temperature of 200° C. or higher. This enables the resin layer 5, the metal layer 3, and the waterproofing resin 27 to be bonded and joined with certainty. In this way, the metallic cable 30*a* is manufactured.

As above, according to the present embodiment, the resin layer 5 is made of resin based on a high-temperature resistant thermoplastic resin with grafted maleic anhydride. Thus, the softening temperature is high and the joint at the overlapped part 23 can be maintained with certainty even at a high temperature. In addition, by forming the outer jacket 17 from either medium-density polyethylene or high-density polyethylene, the resin layer 5 including maleic acid and the metal layer 3 are joined and sealed with certainty, which enables to improve water-stopping performance. Also, the outer jacket 17 and the resin layer 5 are joined continuously in the longitudinal direction with certainty, and this can prevent buckling of the laminated tape 1.

Also, making the resin layer 5 at the overlapped part 23 thicker can further ensure that the overlapped part 23 is joined. For example, since the surface of the outer circumference of the cable core 25 is not always flat (not a perfectly uniform curved surface), the resin layer 5 may have some unevenness when the laminated tape 1 is wrapped around. If the outer jacket 17 is extruded in this state, the gap between the resin layer 5 and the metal layer 3 facing each other at the overlapped part 23 may remain as it is. If, by contrast, the thickness of the resin layer 5 is increased, the resin layer 5 acts like a cushion at the time of extruding the outer jacket 17 and the overlapped part 23 can be joined with certainty.

The same effects can also be obtained by injecting the waterproofing resin 27 into the overlapped part 23. Also, injection of the waterproofing resin 27 can smooth out the level difference at the overlapped part 23 and prevent generation of air accumulation at the time of extruding the outer jacket 17.

Also, since the outer jacket 17 is made of either medium-density polyethylene or high-density polyethylene, although flexibility is slightly impaired, the thickness of the outer jacket 17 can be made thinner. Thus, the cable weighs less and can be bent easily, which improves workability of the cable.

Figure 6:
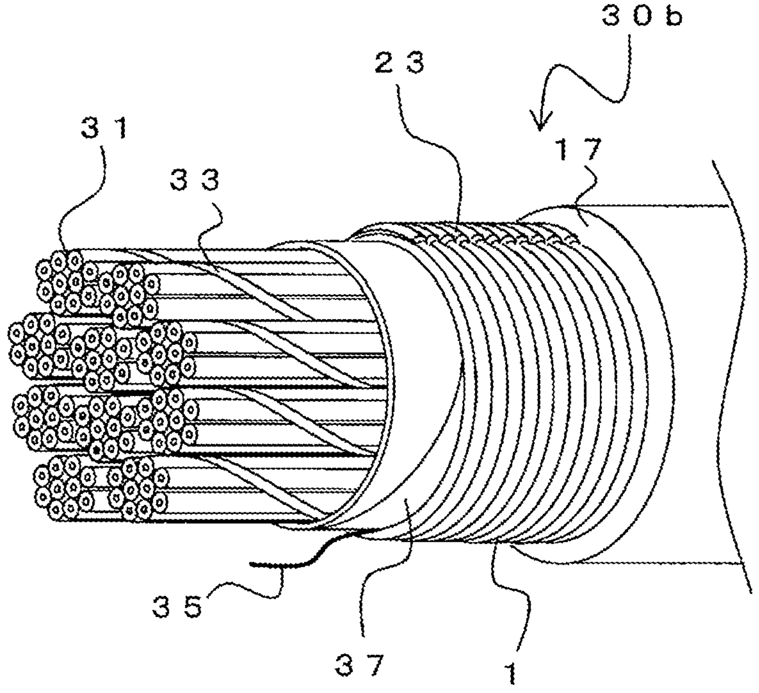
FIG. 6 is a perspective view of a metallic cable 30*b* using the laminated tape 1.

Next, a second embodiment of the present invention will be described. FIG. 6 is a perspective view showing a metallic cable 30*b*. In the descriptions hereafter, the same notations will be used for the same structures as shown in FIG. 1 to FIG. 5 of the metallic cable 30*a*, and redundant descriptions will be omitted.

The metallic cable 30*b* has almost the same structure as the metallic cable 30*a* except that the laminated tape 1 is corrugate processed. A corrugated shape of the laminated tape 1 has peaks and valleys that are repeatedly formed along the longitudinal direction of the cable core 25. Each of the peak and valley parts is formed to be continuous in the circumferential direction.

The corrugated shape of the laminated tape 1 may be formed at the time of manufacturing the laminated tape 1 and then the corrugated laminated tape 1 may be sent and wrapped around the outer circumference of the cable core 25. Alternatively, the laminated tape 1 can be corrugate processed at the same time as forming the laminated tape 1.

As above, the laminated tape 1 can be used being corrugate processed as necessary. In such the case, the thickness of the resin layer 5 at the overlapped part 23 may also be increased, or the waterproofing resin 27 may be injected into the overlapped part 23. The overlapped part 23 may be formed in this way also in the following other embodiments.

Figure 7:
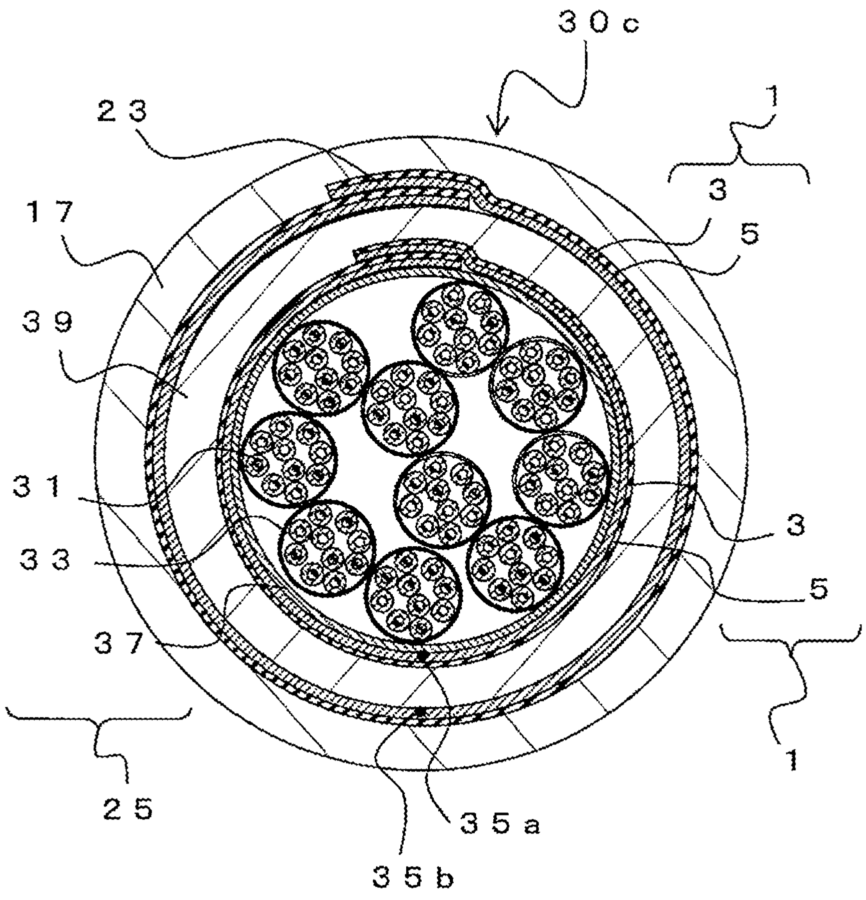
FIG. 7 is a cross-sectional view of a metallic cable 30*c* using the laminated tape 1.

Next, a third embodiment of the present invention will be described. FIG. 7 is a cross-sectional view showing a metallic cable 30*c*. The metallic cable 30*c* includes an inner sheath 39. In the metallic cable 30*c*, similarly to the metallic cables 30*a* and 30*b*, the rough-winding string 33 bundles up the plurality of the coated conduction wires 31, and the press winding tape 37 is further wound around an outer circumference of a plurality of the bundles. The press winding tape 37 may be a rough-winding string since the press winding tape 37 only needs to bundle up a plurality of bundles. In addition, the first laminated tape 1 is wrapped longitudinally around an outer circumference of the press winding tape 37 (the cable core 25), forming the overlapped part 23.

The metallic cable 30*c* includes the inner sheath 39 that is formed on an outer circumference of the first laminated tape 1. The inner sheath 39 is formed by extrusion, for example. The second laminated tape 1 is wrapped further around an outer circumference of the inner sheath 39.

The outer jacket 17 is provided on an outermost circumference of the metallic cable 30*c*, which is also an outer circumference of the outer second laminated tape 1. That is, the second laminated tape 1 is disposed inside the outer jacket 17. The outer jacket 17 is provided covering the outer circumference of the second laminated tape 1 and is bonded with the resin layer 5 of the second laminated tape 1. That is, the metallic cable 30*c* includes two resin layers, i.e., the outer jacket 17 and the inner sheath 39, and there are two layers of the laminated tape 1, which is wrapped inside each of the outer jacket 17 and the inner sheath 39. In the case of having two resin layers of the outer jacket 17 and the inner sheath 39, there may be only one layer of the laminated tape 1 inside either the outer jacket 17 or the inner sheath 39. In such the case, there may be an exterior coating, which fits for purpose, provided inside the outer jacket 17 or the inner sheath 39 where the laminated tape 1 is not disposed. An example of the exterior coating is an iron or a stainless steel coating for preventing the cable from bird and animal damage.

When the inner sheath 39 is provided as above, a rip cord 35*a* is disposed between the first laminated tape 1 on the inner circumference side and the press winding tape 37 (the cable core 25), and a rip cord 35*b* is disposed between the inner sheath 39 and the second laminated tape 1 on the outer circumference side. In this way, pulling out the rip cord 35*b* can rip up the outer laminated tape 1 and the outer jacket 17, exposing the inner sheath 39. Also, pulling out further the rip cord 35*a* can rip up the inner laminated tape 1 and the inner sheath 39 so that the inner coated conduction wires 31 can be taken out.

In the present embodiment, the cable core 25 includes up to the press winding tape 37. However, the cable core 25 may also include the inner sheath 39. In either case, the laminated tape 1 is wrapped around the outer circumference of the cable core. There may be only resin inside the inner sheath 39 without providing the laminated tape 1.

As above, using the laminated tape 1 in the metallic cables 30*a*, 30*b*, and 30*c* can provide reliable water-shielding performance and excellent environment-resistant performance for the metallic cables.

Also, as in the metallic cable 30*c*, by providing the inner sheath 39 and the rip cords 35*a* and 35*b* at respective parts, the outer jacket 17 etc. and the inner sheath 39 etc. can be ripped up separately, which makes the ripping operation easier and prevents the rip cords from breaking or the like.

Figure 8:
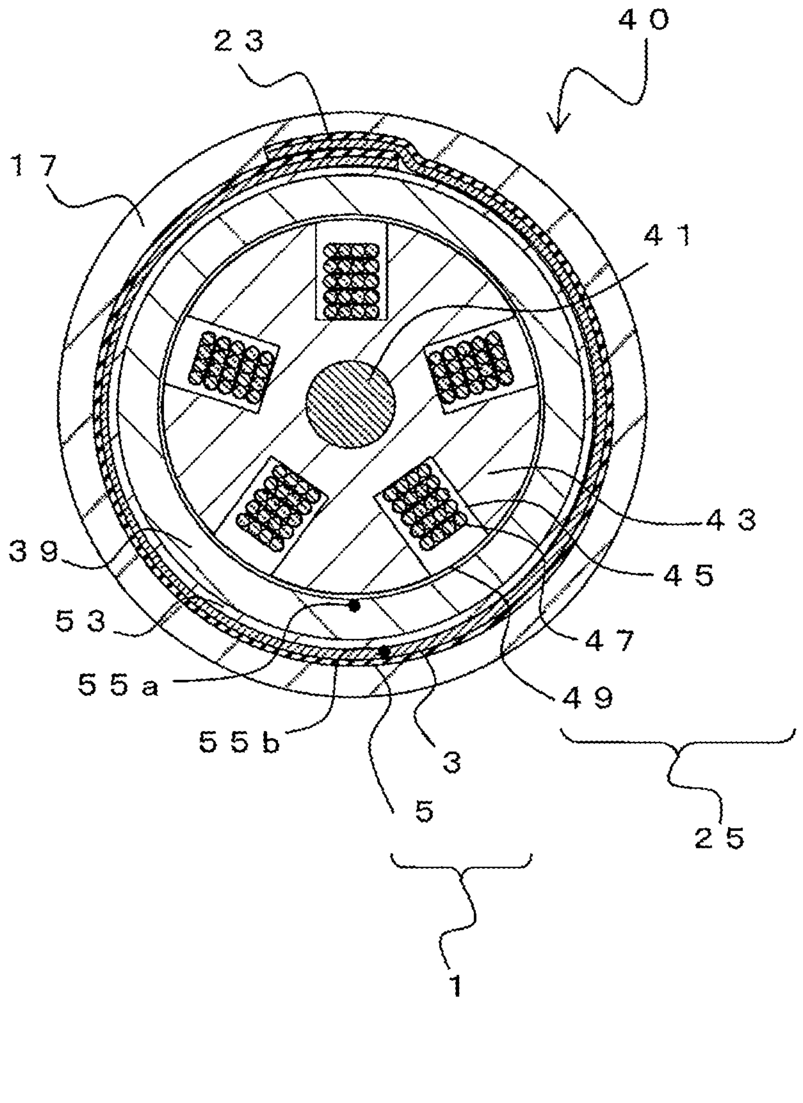
FIG. 8 is a cross-sectional view of an optical cable 40 using the laminated tape 1.

Next, a fourth embodiment will be described. FIG. 8 is a cross-sectional view showing an optical cable 40. The optical cable 40 mainly includes a tension member 41, a spacer 43, optical fiber ribbons 47, the inner sheath 39, the laminated tape 1, and the outer jacket 17.

The spacer 43 is formed of flexible resin. On an outer circumference of the spacer 43, a plurality of slits 45 are provided, and the slits 45 are formed continuously and repeatedly either spirally in one direction along a longitudinal direction of the spacer 43 or in SZ shape in both directions of the longitudinal direction of the spacer 43. The tension member 41 is provided at the center of the spacer 43. The slit 45 accommodates inside a plurality of the optical fiber ribbons 47. The optical fiber ribbon 47 is an optical fiber ribbon in which optical fibers that are adjacent to each other to the longitudinal direction are bonded to each other by UV resin, for example.

A press winding tape 49 is wound around longitudinally or spirally on the outer circumference of the spacer 43. The inner sheath 39 is provided on an outer circumference of the press winding tape 49 (the cable core 25). The inner sheath 39 is formed by extrusion, for example. Also, a protection tape 53 is wound around the outer circumference of the inner sheath 39. The inner sheath 39 and the protection tape 53 are made of resin, and the inner sheath 39 and the protection tape 53 are not bonded.

The laminated tape 1 is wrapped around an outer circumference of the protection tape 53. As mentioned above, the laminated tape 1 is wrapped longitudinally with the resin layer 5 as the outer circumference, providing the overlapped part 23.

Although the cable core 25 includes only up to the press winding tape 49 in the present embodiment, the cable core 25 may also include up to the inner sheath 39 and the protection tape 53, or only up to the inner sheath 39 without using the protection tape 53. As mentioned above, in either case, the laminated tape 1 is wrapped around the outer circumference of the cable core. That is, in the present invention, "the laminated tape 1 is wrapped around the outer circumference of the cable core" includes cases in which other structures such as the protection tape 53 are provided between the cable core and the laminated tape 1. Furthermore, similarly to the metallic cables mentioned above, the laminated tape 1 may have a flat surface or a corrugate processed surface. Also, an exterior coating that fits for purpose can be provided on a layer where the laminated tape 1 is not provided.

The outer jacket 17 is provided on an outermost circumference of the optical cable 40, which is an outer circumference of the laminated tape 1. That is, the laminated tape 1 is disposed inside the outer jacket 17. The outer jacket 17 is provided so as to cover the outer circumference of the laminated tape 1 and is bonded with the resin layer 5 of the laminated tape 1.

Also in the optical cable 40, rip cords are disposed between the laminated tape 1 and the cable core 25. In the illustrated example, the rip cord 35*a* is disposed between the press winding tape 49 (the cable core 25) and the inner sheath 39, and the rip cord 35*b* is further disposed between the protection tape 53 and the laminated tape 1. Pulling out the rip cord 35*b* can rip up the laminated tape 1 and the outer jacket 17 and expose the protection tape 53 and the like inside. Also, pulling out the rip cord 35*a* in addition can rip up the inner sheath 39 and the protection tape 53, and the optical fiber ribbons 47 inside can be taken out.

In the optical cable 40, a shape, the number, or depth of the slit 45 and the configuration of the optical fiber ribbons 47 and the like are not limited to the illustrated examples. Also, the inner sheath 39 and the protection tape 53 are not always necessary.

As above, applying the laminated tape 1 to the optical cable 40 can provide excellent water-shielding performance and environment-resistant performance for the optical cable. Also, to further improve the water-shielding performance, the resin layer 5 may be formed such that the overlapped part 23 of the laminated tape 1 can be easily bonded.

Also, winding the protection tape 53 between the rip cord 35*b* and the inner sheath 39 can prevent the rip cord 35*b* from cutting into or adhering to the inner sheath 39 and becoming difficult to be pulled out.

As above, the laminated tape 1 can be applied suitably to various types of cables.

Working Examples

Next, various samples of the cable shown in FIG. 1 are produced by changing the resin layer and the outer jacket, etc., and are evaluated for exterior abnormality and existence of buckling of the laminated tape after twisting tests. The laminated tape being used includes a metal layer made of stainless steel of 150 μm and a resin layer made of low-density polyethylene of 100 μm. The cable has an overall diameter of approximately 23 mm and is cut into 1.5 m each to be evaluated. Table 1 shows the conditions and results.

TABLE 1

| | Outer jacket material | Extrusion temp. (° C.) | Average thickness of outer jacket (mm) | Base resin of resin layer | Existence of grafted maleic anhydride | Overlapped Part Length (mm) | Amount of resin is more at the operlapped part than the other region | Twisting Test |
|---|---|---|---|---|---|---|---|---|
| Working Example 1 | HDPE | 230 | 2.0 | HDPE | Exists | 15 | yes | good |
| Working Example 2 | HDPE | 230 | 2.0 | HDPE | Exists | 10 | yes | good |
| Working Example 3 | HDPE | 230 | 1.5 | HDPE | Exists | 10 | yes | good |
| Working Example 4 | MDPE | 200 | 2.0 | MDPE | Exists | 10 | yes | good |
| Working Example 5 | HDPE | 200 | 2.0 | HDPE | Exists | 10 | yes | good |
| Working Example 6 | HDPE | 230 | 2.0 | PP | Exists | 10 | yes | good |
| Working Example 7 | MDPE | 200 | 2.0 | PP | Exists | 10 | yes | good |
| Comparison Example 1 | HDPE | 230 | 2.0 | HDPE | None | 15 | yes | bad |
| Comparison Example 2 | LDPE | 160 | 2.0 | LDPE | Exists | 15 | yes | bad |
| Comparison Example 3 | HDPE | 230 | 2.0 | HDPE | Exists | 15 | no | bad |
| Comparison Example 4 | HDPE | 230 | 2.0 | LDPE | Exists | 15 | yes | bad |
| Comparison Example 5 | MDPE | 230 | 2.0 | EVA | Exists | 15 | yes | bad |
| Comparison Example 6 | LDPE | 230 | 2.0 | LDPE | Exists | 15 | yes | bad |

"Existence of grafted maleic anhydride" shows whether maleic anhydride added to the base resin of HDPE is grafted or not. "Amount of resin is more at the overlapped part than the other region" is 'yes' when the resin layer at the overlapped part is thick (with the injection of the water-proofing resin), and is 'no' when there is no change in the thickness of the overlapped part.

The twisting test is performed at a temperature of 75° C. First, both ends of the cable are held, and one of the ends is twisted 90° in one direction, twisted back to an original position, twisted 90° in the opposite direction, and then twisted back to the original position. This is counted as one round of 90° twisting, and eight rounds of the 90° twisting are tested. At this time, similarly to the exterior abnormality, the twisting test is marked as 'good' when there is no buckling of the laminated tape or cracking in the outer jacket; and the twisting test is marked as 'bad' when there is buckling of the laminated tape or cracking in the outer jacket.

Working Examples 1 to 7 include the outer jackets made of either medium-density polyethylene (MDPE) or high-density polyethylene (HDPE), and the base resin of the laminated tape is either medium-density polyethylene (MDPE), high-density polyethylene (HDPE), or polypropylene (PP), added with 1% of maleic anhydride and grafted. Thus, Working Examples 1 to 7 passed both of the exterior abnormality and the twisting test ('good').

In a cable of Comparative Example 1, on the other hand, in which a laminated tape using a resin layer formed of resin without adding maleic acid is used and an outer jacket is formed by extruding HDPE, the laminated tape lifts up at the overlapped part and there is also buckling of the laminated tape at some parts. This may be because the laminated tape and the outer jacket are not joined continuously in the longitudinal direction of the cable.

If the laminated tape and the outer jacket are not joined continuously in the longitudinal direction of the cable, either the laminated tape or the outer jacket is to counter the twisting force and thus an excessive load is applied. This may cause lifting at the overlapped part or bucking of the laminated tape. If, on the other hand, the laminated tape and the outer jacket are joined continuously in the longitudinal direction of the cable, the laminated tape and the outer jacket can counter the twisting force together. For this reason, Comparative Example 1 failed the twisting test ('bad).

Also, in Comparative Example 2, the outer jacket is made of low-density polyethylene and the extrusion temperature is low. Thus, Comparative Example 2 failed the twisting test ('bad').

Also, in Comparative Example 3, the amount of resin at the overlapped part is the same as the other parts, without addition of the waterproofing resin or the like, and thus Comparative Example 3 failed the twisting test ('bad). This is because there is no injection of the waterproofing resin and thus the overlapped part opens up in some cases at the time of twisting the cable. The twisting test is supposed to be an acceleration test on the assumption that the cable is installed while being twisted under a use environment. The separation at the overlapped part is considered as a phenomenon that occurs when stress is applied continuously to the overlapped part of the laminated tape for a long period of time to an extent that the bonded part cannot bear the stress anymore. Thus, by filling the overlapped part with additional resin that is same as the resin layer of the laminated tape at the time of applying the laminated tape longitudinally to the cable core and by forming the outer jacket in such the state, there may be no separation of the laminated tape at the overlapped part even if the cable is bent for a long time.

In Comparative Example 4 where the base resin of the resin layer of the laminated tape is low-density polyethylene (LDPE), and in Comparative Example 5 where the base resin of the resin layer of the laminated tape is ethylene vinyl acetate copolymer (EVA), the base resin of the resin layer of the laminated tape softens in the twisting test, and thus the overlapped part is separated and the outer jacket is damaged.

Also, in Comparative Example 6 where the outer jacket resin is low-density polyethylene (LDPE) and the base resin of the resin layer of the laminated tape is also low-density polyethylene (LDPE) with the extrusion temperature of 230° C., the base resin of the resin layer of the laminated tape also softens in the twisting test, and thus the overlapped part is separated and the outer jacket is damaged.

Although the embodiments of the present invention have been described referring to the attached drawings, the technical scope of the present invention is not limited to the embodiments described above. It is obvious that persons skilled in the art can think out various examples of changes or modifications within the scope of the technical idea disclosed in the claims, and it will be understood that they naturally belong to the technical scope of the present invention.

For example, needless to say, the structures of the above-mentioned embodiments can be combined with each other.

What is claimed is:

1. A cable comprising:

a cable core;

an outer jacket that is provided on an outermost circumference of the cable core; and a laminated tape that is disposed inside the outer jacket and wrapped around an outer circumference of the cable core, wherein the laminated tape includes a resin layer and a metal layer that are laminated on one another, and the laminated tape is wrapped around the outer circumference of the cable core forming an overlapped part at which both end parts of the laminated tape are overlapped;

a base resin of the resin layer includes at least one of medium-density polyethylene, high-density polyethylene, or polypropylene, and the base layer is added with maleic anhydride and grafted;

an amount of resin at and around the overlapped part of the laminated tape is greater than an amount of resin at parts other than the overlapped part; and the outer jacket is made of polyethylene having a density that is equal to or greater than that of the medium-density polyethylene.

2. The cable according to claim 1, wherein the outer jacket is made of the high-density polyethylene.

3. The cable according to claim 1, wherein the outer jacket and the resin layer of the laminated tape are joined together continuously in a longitudinal direction.

4. The cable according to claim 1, wherein a part of the overlapped part of the laminated tape having a thickness that is greater than a thickness of the resin layer at parts other than the overlapped part is formed.

5. The cable according to claim 1, wherein waterproofing resin is injected into the overlapped part of the laminated tape.

6. The cable according to claim 5, wherein the waterproofing resin is made of a material same as the resin layer of the laminated tape.

7. The cable according to claim 1, wherein a thickness of the outer jacket is 10% or less of an outer diameter of the cable.

8. The cable according to claim 1, wherein a thickness of the outer jacket is 8% or less of an outer diameter of the cable.

9. A method for manufacturing the cable according to claim 1, the method comprising:

wrapping the laminated tape;

injecting waterproofing resin into a space between both ends of the laminate tape at the overlapped part before extruding the outer jacket; and extrusion forming the outer jacket at a temperature of 200° C. or higher.

* * * * *